(12) United States Patent
Stellhorn et al.

(10) Patent No.: US 8,099,345 B2
(45) Date of Patent: Jan. 17, 2012

(54) FINANCIAL ACCOUNT INFORMATION MANAGEMENT AND AUDITING

(75) Inventors: David W. Stellhorn, Iron Station, NC (US); David M. Andersen, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 952 days.

(21) Appl. No.: 11/866,498

(22) Filed: Oct. 3, 2007

(65) Prior Publication Data
US 2008/0243715 A1    Oct. 2, 2008

Related U.S. Application Data

(60) Provisional application No. 60/909,604, filed on Apr. 2, 2007.

(51) Int. Cl.
*G06Q 40/00* (2006.01)
*G07B 17/00* (2006.01)
*G07F 19/00* (2006.01)
*G06F 7/00* (2006.01)
*G06F 17/00* (2006.01)

(52) U.S. Cl. ............. 705/35; 705/30; 705/39; 707/607; 707/661; 707/693; 707/999.001; 707/999.101

(58) Field of Classification Search ............... 705/36 R
See application file for complete search history.

(56) References Cited

U.S. PATENT DOCUMENTS

| | | | | | |
|---|---|---|---|---|---|
| 4,918,593 | A | * | 4/1990 | Huber .................................... | 1/1 |
| 5,499,293 | A | * | 3/1996 | Behram et al. ................... | 705/76 |
| 5,721,909 | A | * | 2/1998 | Oulid-Aissa et al. ................. | 1/1 |
| 5,819,251 | A | * | 10/1998 | Kremer et al. ......................... | 1/1 |
| 5,953,723 | A | * | 9/1999 | Linoff et al. .......................... | 1/1 |
| 5,956,724 | A | * | 9/1999 | Griffiths ................ | 707/999.006 |
| 6,012,062 | A | * | 1/2000 | Jagadish et al. ...................... | 1/1 |
| 6,094,649 | A | * | 7/2000 | Bowen et al. ................. | 707/711 |
| 6,169,990 | B1 | * | 1/2001 | McGregor et al. .................... | 1/1 |
| 6,208,993 | B1 | * | 3/2001 | Shadmon .............................. | 1/1 |
| 6,470,345 | B1 | * | 10/2002 | Doutre et al. ......................... | 1/1 |
| 6,484,161 | B1 | * | 11/2002 | Chipalkatti et al. .................. | 1/1 |
| 6,792,422 | B1 | | 9/2004 | Stride et al. | |
| 6,965,897 | B1 | * | 11/2005 | Chen .................................... | 1/1 |
| 7,031,956 | B1 | * | 4/2006 | Lee et al. .............................. | 1/1 |
| 7,054,841 | B1 | * | 5/2006 | Tenorio ............................ | 705/57 |

(Continued)

OTHER PUBLICATIONS

Database Architecture for Data Warehousing: An Evolutionary Approach; José Samos, Fèlix Saltor, Jaume Sistac, and Agustí Bardés; 1998; 11-pages.*

(Continued)

*Primary Examiner* — Gregory Johnson
(74) *Attorney, Agent, or Firm* — Banner & Witcoff, Ltd.; Michael A. Springs

(57) ABSTRACT

A database-driven software application may be provided that is configured to keep a record of mainframe activity for various financial transactions and provide relationships between various transactional features. The information of these financial transactions may originate from a single system in a single data format or may be integrated into a single consistent format from a plurality of systems in a plurality of formats. Such an application may enable the reporting of anomalous events and/or the review of activities conducted by a financial associate (e.g., an employee of the financial institution) and/or those impacting a specific customer or account. The system may operate by parsing daily feeds of raw mainframe logs and extracting relevant details and placing information about each transaction in a data warehouse.

8 Claims, 9 Drawing Sheets

U.S. PATENT DOCUMENTS

| | | | |
|---|---|---|---|
| 7,315,849 B2 * | 1/2008 | Bakalash et al. | 1/1 |
| 7,319,994 B1 * | 1/2008 | Sercinoglu | 1/1 |
| 7,475,030 B1 * | 1/2009 | Tenorio | 705/26.8 |
| 7,765,157 B2 * | 7/2010 | Bennett et al. | 705/50 |
| 7,882,084 B1 * | 2/2011 | Amdahl | 707/693 |
| 7,966,352 B2 * | 6/2011 | Madan et al. | 707/821 |
| 2002/0010679 A1 * | 1/2002 | Felsher | 705/51 |
| 2002/0010682 A1 * | 1/2002 | Johnson | 705/59 |
| 2002/0107743 A1 * | 8/2002 | Sagawa | 705/17 |
| 2003/0135495 A1 * | 7/2003 | Vagnozzi | 707/3 |
| 2003/0197782 A1 * | 10/2003 | Ashe et al. | 348/150 |
| 2004/0054858 A1 * | 3/2004 | Chandrasekaran et al. | 711/154 |
| 2004/0064692 A1 * | 4/2004 | Kahn et al. | 713/167 |
| 2004/0155960 A1 * | 8/2004 | Wren et al. | 348/150 |
| 2005/0182779 A1 | 8/2005 | Perry et al. | |
| 2005/0262479 A1 * | 11/2005 | Ageyev et al. | 717/120 |
| 2006/0184561 A1 * | 8/2006 | Terada | 707/102 |
| 2006/0224637 A1 * | 10/2006 | Wald | 707/200 |
| 2007/0050333 A1 * | 3/2007 | Vogler | 707/3 |
| 2007/0203930 A1 * | 8/2007 | Spellman et al. | 707/101 |
| 2008/0021834 A1 * | 1/2008 | Holla et al. | 705/51 |
| 2008/0114793 A1 * | 5/2008 | Grosset et al. | 707/101 |
| 2008/0162590 A1 * | 7/2008 | Kundu et al. | 707/202 |

OTHER PUBLICATIONS

Using Queries to Improve Database Reverse Engineering; J-M. Petit, J. Kouloumdjian, J-F. Boulicaut, F. Toumani; Proceeding ER '94 Proceedings of the 13th International Conference on the Entity-Relationship Approach; Springer-Verlag London, UK 1994; 18-pages.*

Metadata Modelling for Healthcare Applications in a Federated Database System; M. Roantree, P. Hickey, A. Crilly, J. Cardiff, J. Murphy; School of Computer Applications, Dublin City University, Dublin, Ireland; Trends in Distributed Systems CORBA and Beyond Lecture Notes in Computer Science, 1996, vol. 1161/1996, 71-83; 13-pages.*

The Active Database Management System Manifesto: A Rulebase of ADBMS Features (1995); Klaus R. Dittrich, Stella Gatziu, Andreas Geppert; 1995; 15-pages.*

International Search Report and Written Opinion for PCT/US08/58977 dated Nov. 3, 2008.

Examination Report in GB0918198.3, dated Apr. 19, 2011.

Examination Report Under Section 18(3) in GB0918198.3 dated Sep. 12, 2011, 2 pages.

* cited by examiner

Bank

Clear Fields | Submit
506 | 507

502 — Date Range: 1/5/2007 to: 2/8/2007

☒ Associate IDs: ☐ Trans Codes: ☒ Acct Numbers: ☐ Cust/SSNs:

503 —
- XXXXXX
- XXXXXX

- X-XXXXXXXX
- X-XXXXXXXX
- X-XX-XXX-XXX

504 — Saved Searches

505 — Search Results ◀=Response ▶=Request Export

Bank

| | Clear Fields | Submit |
|---|---|---|
| | 506 | 507 |

502 — Date Range: 1/5/2007 to: 2/8/2007

☒ Associate IDs:   ☐ Trans Codes:   ☒ Acct Numbers:   ☐ Cust/SSNs:

| XXXXXX | | X-XXXXXXXX | |
| XXXXXX | | X-XXXXXXXX | |
| | | X-XX-XXX-XXX | |

503

504 — Saved Searches

505 — Search Results     ◀=Response   ▶=Request     Export

| Associate ID | Trans Code | Acct Number | Cust/SSN |
|---|---|---|---|
| XXXXXX | XX | X-XXXXXXXX | XXX-XX-XXXX ▶ |
| | XXX | X-XXXXXXXX | XXX-XX-XXXX ◀ |
| XXXXXX | XX | X-XXXXXXXX | XXX-XX-XXXX ▶ |
| | XXX | X-XX-XXX-XXX | XXX-XX-XXXX ▶ |

FINANCIAL ACCOUNT INFORMATION MANAGEMENT AND AUDITING

CROSS-REFERENCE TO RELATED APPLICATIONS

This application claims priority to U.S. provisional patent application Ser. No. 60/909,604, entitled "Financial Account Information Management and Auditing," filed Apr. 2, 2007, hereby incorporated by reference as to its entirety.

BACKGROUND

Fraud and identity theft are large and growing problems in the financial industry. From an investigative standpoint, each new case has to be treated separately from all others and investigated after the fact. Financial transactional systems are designed for performance and reliability, not auditing. Because of storage constraints and the load on the transactional systems, investigators often required weeks or months to investigate a single incident. Meanwhile, the dishonest person who committed the first fraud has had the opportunity to repeat the offense dozens or hundreds of times.

In the past, fraud research has generally been performed from the original transactional system, which typically archives a tremendous amount of data regarding financial transactions, on the order of hundreds of terabytes or more. This renders impractical the possibility of aggregating data to automate searches for fraud rings and other organized inappropriate activity. To make matters worse, such financial transaction information may originate from more than one source and be provided in more than one format. This situation is particularly common where the financial institution is a conglomerate of smaller disparate financial institutions each using its own different data management system.

SUMMARY

Various aspects are described herein. For example, a method, system, and software are described in a financial transaction management system that store in a first database first data representing a plurality of financial transactions; store in a second database second data referencing the first data; and retrieve data representing one of the financial transactions from the first database using the second database as a dictionary.

In addition, a method, system, and software are described that stores in a first database a plurality of data blocks each representing a different one of a plurality of financial transactions; stores in a second database data representing aspects of the corresponding financial transaction of each of the data blocks, each subset further referencing a location of the corresponding one of the data blocks; receiving a query including a criterion; retrieving data from the second database based on the criterion and representing one of the locations; and retrieves one of the data blocks from the first database found at the one of the locations.

As another example, a method, system and software are described that aggregate financial transaction data from a plurality of different financial institutions, the data from the different financial institutions being in different formats; convert the data from the different financial institutions to a single common format; and search the converted data to find financial transactions.

These and other aspects of the disclosure will be apparent upon consideration of the following detailed description.

BRIEF DESCRIPTION OF THE DRAWINGS

A more complete understanding of the present disclosure may be acquired by referring to the following description in consideration of the accompanying drawings, in which like reference numbers indicate like features, and wherein:

FIG. 5 is an illustrative screenshot of a computer-based user interface;

FIG. 10 is an illustrative screenshot of the computer-based user interface of FIG. 5, including search results.

Figure 1:
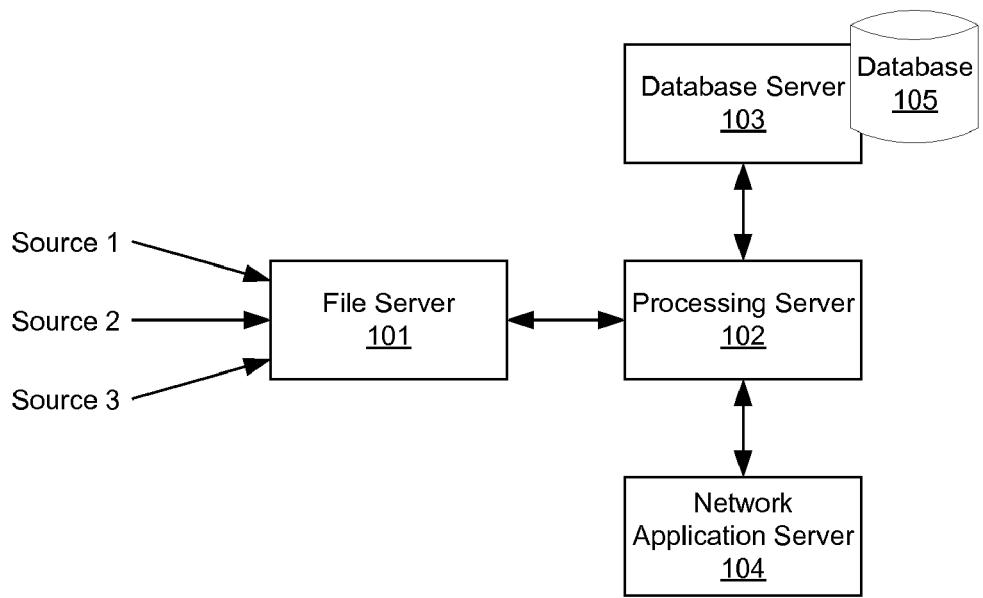
FIG. 1 is an illustrative functional block diagram of a system for performing financial account management and auditing, from the point of view of a data staging and load process.

It is noted that the drawings are not necessarily to scale.

DETAILED DESCRIPTION

The following description shows by way of illustration various examples in which aspects of the invention may be practiced. It is understood that other examples may be utilized, and that structural and functional modifications may be made, without departing from the scope of the present disclosure.

Except where explicitly stated otherwise, all references herein to two elements being "coupled" to each other is intended to include both (a) the elements being directly connected to each other, or in direct communication with each other, without any intervening elements as well as (b) the elements being indirectly connected to each other, or in indirect communication with each other, with one or more intervening elements.

Various aspects of illustrative systems, apparatuses, and methods as disclosed herein may allow investigators to quickly identify relevant data for forensic analysis at the start of a case. In such a system, a database-driven software application may be provided that is configured to keep a record of mainframe activity for various financial transactions and provide relationships between various transactional features. The information of these financial transactions may originate from a single system in a single data format or may be integrated into a single consistent format from a plurality of systems in a plurality of formats.

Such an application may enable the reporting of anomalous events and/or the review of activities conducted by a financial associate (e.g., an employee of the financial institution) and/or those impacting a specific customer or account. The system may operate by parsing daily feeds of raw mainframe logs and extracting relevant details and placing information about each transaction in a data warehouse. This may allow for much faster searching and reporting.

In a traditional "after the fact" investigation, investigators may be enabled to identify other suspicious activity on the part of the suspect and of other related suspects. In a prophylactic approach, such systems may provide data and/or algorithms to search for a set of "red flags" that alert investigators to suspicious activity before a fraud report is even filed. For instance, transactions that occur well outside of business hours may be flagged for later analysis and scrutiny. As another example, those transactions that impact customers with a relationship to the associate (e.g., the associate's manager) making the transaction may be also flagged.

Such a system may uniquely solve the problem of auditing consumer banking transactions (or other financial transactions with other financial institutions) by allowing a person to rapidly determine what actions were taken by a user or on a customer or account. This may be enabled by building a database, for example, that relates subjects (users) with objects (customers and/or accounts) according to transaction time and transaction code. Each relationship may contain enough information to uniquely identify the source transaction data and allow for its reconstruction. The database structure may allow one to easily perform aggregation and may be used to identify suspects of a crime even when the identity of its victim(s) isn't clear. This may allow for reporting of anomalous events and for the review of activities conducted by a financial institution associate or those impacting a specific customer or account.

According to various illustrative embodiments, the following are features that may be implemented. A production database may be used as a compression dictionary that references a compressed or non-compressed raw bulk database. Mainframe data may be supplied as a continuous stream of data containing any transaction that the system can run. When a transaction is recognized by a parsing utility, the components that are relevant for searching may be copied out into a database table. The offset (position) of a transaction within the overall file may be also recorded and stored in the database.

After a days' data stream is completed, a custom compression process starts. This process may use, e.g., a block-based compression routine to create a file about 15% of the original size of the data. During the compression process, the offset of each block may be recorded and matched with the corresponding offset within the uncompressed file.

When a search is performed in the production database and a specific transaction identified, its uncompressed offset may be returned from the data. The returned offset may be cross referenced against the offset recorded in the compression step to identify the correct block in the compressed raw database. The appropriate block is read from the raw database, decompressed, and the raw transaction is decompressed to return all of the data to the user. Because of this technique, the application may be able to reconstruct the original mainframe screens. The databases may be used to normalize search elements (time, user & customer identity, account ids) across different systems without necessarily affecting the original data.

As another example of a concept described herein, financial transaction data may be aggregated from a plurality of different financial institutions in different formats, converting the data to a single common format, and search capabilities on the converted data may be provided to find financial transactions. To accomplish this, parsers may be provided that make use of a set of xml definition files to represent each mainframe transaction and to potentially make the definition files easily changeable. The parsers may be configured in a hierarchy having at least three levels, and may receive data in a plurality of different formats and output data in a single common format.

Another concept described is the provision of a first database and a second database, wherein the first database contains plurality of data blocks representing financial transactions, wherein the second database contains a subset of each of the data blocks. Each subset may be associated with a reference to a corresponding data block in the first database.

Compression, Parsing, and Initial Loading

Referring to FIG. 1, an illustrative functional block diagram of a system is shown that may be used to perform financial account information management and/or auditing activities. The system as shown may include a file server 101, a processing server 102, a database server 103, a database 105, and/or a network application server 104, all coupled together as shown or in any other manner desired. File server 101 may be implemented as, for example, a file transfer protocol (FTP) based server.

File server 101 may receive one or more data sets (e.g., one or more FTP sessions). For instance, in the shown example, three FTP sessions Source 1, Source 2, and Source 3 are received by file server 101. Each FTP session or other set of data may originate from a different physical source or the same physical source, and may be of different data formats or the same data format. The various data sets may include one or more pieces of information associated with each of a plurality of financial account transactions. Examples of financial account transactions include, but are not limited to, a deposit into a financial account (such as an account held through a bank or other financial institution), a withdrawal from the financial account, an inquiry into information about the financial account, and a change of information about the financial account (e.g., change of account holder address, change of account holder name, etc.). Examples of pieces of information associated with a financial account include, but are not limited to, account balance, account history, account ownership (e.g., account owner's name, address, social security number), account identifier (e.g., account number), account transaction type identifier (e.g., transaction code, transaction description, transaction source, transaction category), and an identifier of the associate (e.g., employee or other agent of the financial institution) implementing the transaction.

Figure 2:
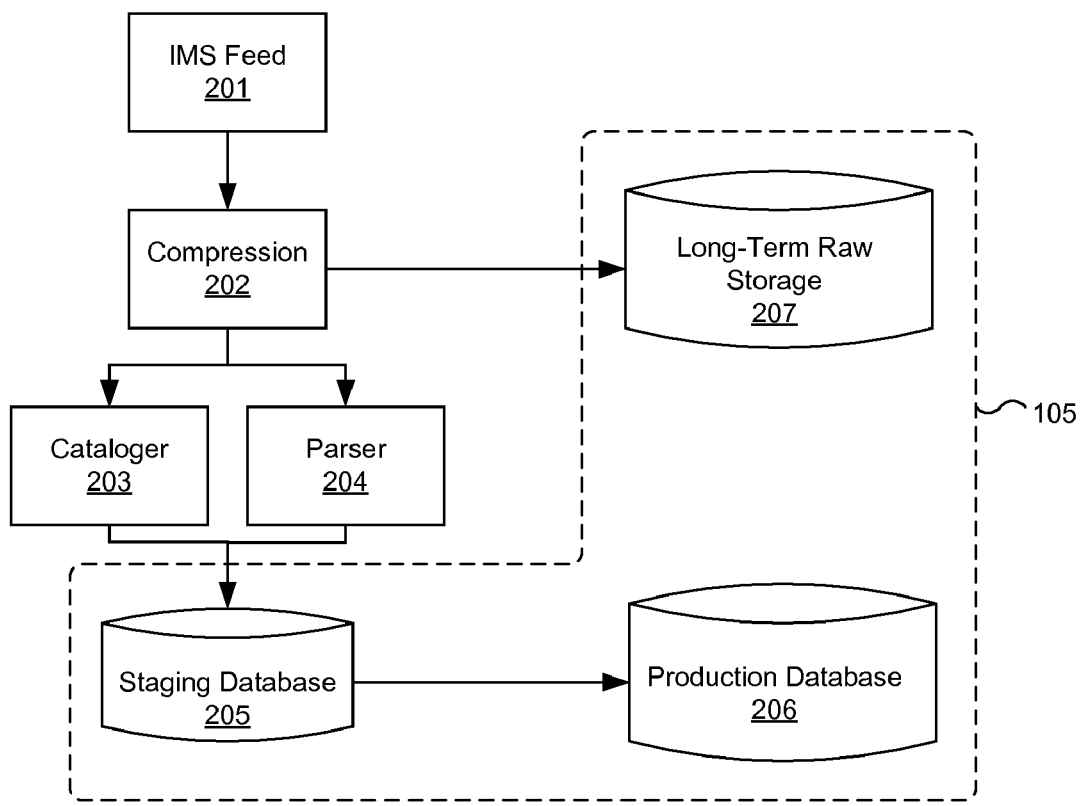
FIG. 2 is another illustrative functional block diagram of the system of FIG. 1.

Referring to FIG. 2, another illustrative functional block diagram is shown of various high-level functions that may be performed by the system of FIG. 1. A data feed in the form of, e.g., an Information Management Systems (IMS) feed 201 may be provided as files that contain Source 1, Source 2, and Source 3. A job scheduling system may handle each input file by performing jobs in a queue. These jobs may, in turn, schedule successor jobs. For instance, the job that catalogs a file may in turn queue up the actual parse job upon successful completion.

Once a file is received, it may be moved, compressed 202, and dispatched to the proper cataloger 203 (which may determine various statistics and/or the data quality of the incoming files) and parser 204. All files may be immediately compressed 202 using, for example, bzip2 with 300 KB block sizes. The compressed files may be stored in a long-term raw storage 207 (although the files may alternatively be stored in uncompressed form in storage 207).

The types of the files may be, for example, lightweight directory interchange format (LDIF) files from a corporate directory of the financial institution, and/or logs from various financial transactions. Delta feeds from the corporate directory may be parsed using a custom LDIF parser that creates a database record for every change. In order to determine the value for a specific attribute for a given person and for a given point in time, the newest attribute value may be determined for that person with the greatest version number that is less than or equal to the version number of the date in question. This may allow other applications to display information about financial institution associates and/or match account holder social security numbers (SSNs) to financial institution associate identifiers.

For instance, Source 1 may be processed as follows. Cataloger 203 may take the compressed file and records information about the data of Source 1 and assigns the data a unique identifier. Cataloger 203 may further hash the file and obtain the date range it covers, along with the bzip2 block state variables for each block. Parser 204 may read in a set of COBOL layouts when it starts up and convert the layouts into an object tree. Parser 204 may then read each IMS Fast Path transaction and decompresses it if necessary or desired. The proper layout may be selected according to the transaction code and screen name. The layout may define the offsets, lengths, and/or data types of some or all fields in the record. The values for fields that map to database records may be extracted and copied into staging database 205. Source 1 uses separate customer identifiers that may be mapped to party IDs. Generally, customer identifiers may be represented as negative numbers, and the few financial transactions that actually involve party IDs may have those party IDs represented as positive numbers. When the end of the file is reached, all records are flushed to staging database 205 and a stored procedure may be called to indicate that the parsing stage is completed and that the file is ready to be loaded into production database 206.

Since Source 2 in this example is in a format different than Source 1, Source 2 may be processed slightly differently. For example, Source 2 may be processed as follows. Cataloger 203 may take the compressed file, record information about it, and assign the file a unique identifier. Cataloger 203 may further hash the file and obtain the date range it covers, along with the bzip2 block state variables for each block. Parser 204 may read in a set of COBOL layouts when it starts up and convert the layouts into an object tree. Parser 204 may then read each IMS transaction. The proper layout may be selected according to the transaction code. The layout may define the offsets, lengths, and data types of all fields in the record. The values for fields that map to database records may be extracted and copied into staging database 205. Source 2 may not use party IDs, so that table may not be loaded with any rows. Again, when the end of the file is reached, all records are flushed to staging database 205 and a stored procedure may be called to indicate that the parsing stage is completed and that the file is ready to be loaded into production database 206.

Parser 204 may parse the disparate file formats from Source 1, Source 2, and Source 3 into a single common data format. Various different sub-parsers within parser 204 may be used given that the data for each of Source 1, Source 2, and Source 3 may be completely different. However, each sub-parser may yield output in essentially the same format, allowing for easier loading into the production database. This way, the cataloging and parsing of data may be abstracted by using a common interface, thereby potentially yielding a standardized and extensible process. Thus, for each incoming data format of Source 1, Source 2, and Source 3, a separate cataloger and sub-parser may be used. After cataloging and/or parsing, some or all of the parsed data may be stored in a staging database 205 for eventual movement into a larger production database 206.

Figure 3:
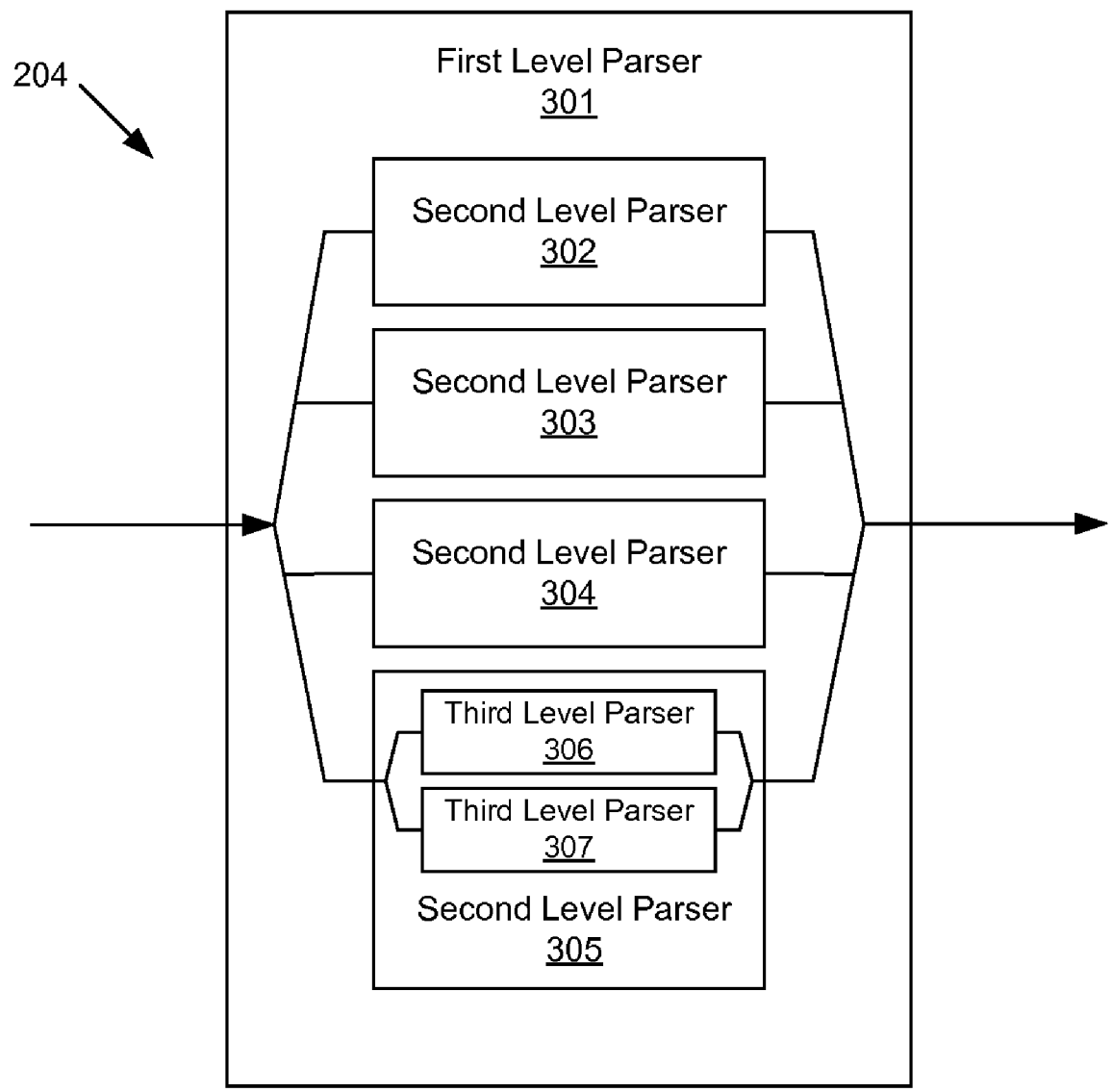
FIG. 3 is an illustrative functional block diagram of a parser hierarchy.

Referring FIG. 3, an illustrative functional block diagram of parser 204 is shown. Parser 204 may include a plurality of sub-parsers (second level parsers) 302, 303, 304, 305. The main portion of parser 204 (i.e., first level parser 301) may be able to obtain, for example, the date, time, transaction code, user ID and logical terminal from the front of the data record. However, in order to get, for example, SSNs, party IDs, account numbers, and/or other information, specialized sub-parsers may be used, each for a different incoming data format of Source 1, Source 2, and Source 3. Moreover, one or more of the sub-parsers may also include one or more sub-sub-parsers (third level parsers), such as third level parsers 306 and 307. Third level parsers 306, 307 may be additionally used for parsing different portions of data in a particular data format.

Each level of parser 204 may be configured to not only parse some or all of the incoming transaction data, but also to determine whether and which next lower level parser is needed and to direct the data to that appropriate next level parser. By providing for such a hierarchical parser 204 that performs incremental structuring of data, parsing of different data formats may be performed in parallel, thus allowing for high performance of the overall system. In the shown example, a three-level hierarchy of parsers is shown. However, other numbers of levels may be used, such as a two-level hierarchy or a four-level hierarchy.

Second level parser 302 may, for example, handle certain types of transactions and operate using definitions collected from the mainframe and stored in XML format. Second level parser 302 may handle all versions of all segments and may be able to auto-detect which version is in use when that information is not available. Second level parser 302 may be configured to scan through each token of the transaction and use the detected layout to determine what each field is. The fields representing SSNs, party IDs, and account numbers, for example, may be marked and their values extracted and placed in appropriate tables of staging database 205.

Second level parser 303 may, for example, be similar to second level parser 302, but it may only need to deal with a smaller set of definitions. Second level parser 303 also may not handle multi-segment messages. This second level parser 303 also may have definitions stored in XML files. The data formats sent to second level parser 303 may not involve, for instance, party IDs, so only SSNs and account numbers (for example) may be extracted.

Second level parser 304 may use definitions indicating the ordering, sizes, names, and types of the elements that make up certain types of transactions such as bank teller transactions. Second level parser 304 may derive the layout of these elements using the lengths of the data fields, and may generate signatures based on the data field lengths and compare them against the lengths of delimited strings. At this point, the data in each field may be parsed in a manner similar to that of a single segment of data parsed by second level parser 302. If no signature matches the data, second level parser 304 may fall back to a regular expression technique that attempts to extract account numbers, party IDs, and SSNs.

Second level parser 305 may be, for example, purely driven by regular expressions. The log records may not have easily inferred definitions.

The use of staging database 205 effectively as a buffer may allow the various levels of parsers to run in parallel, which may help to maintain a high data throughput.

Production loads may be accomplished by a routine that runs periodically, for example each evening at 9 pm EST. The routine may check for any new data loaded by parsers 204 into staging database 205. The routine may then convert and load the new data into production database 206. The routine may first locate the oldest available data that has not been loaded. The routine may load up to a predetermine amount of data (e.g., one week's worth of data) at a time. An example of this routine is described with reference to FIG. 4.

Staging/Loading Into Production

Figure 4:
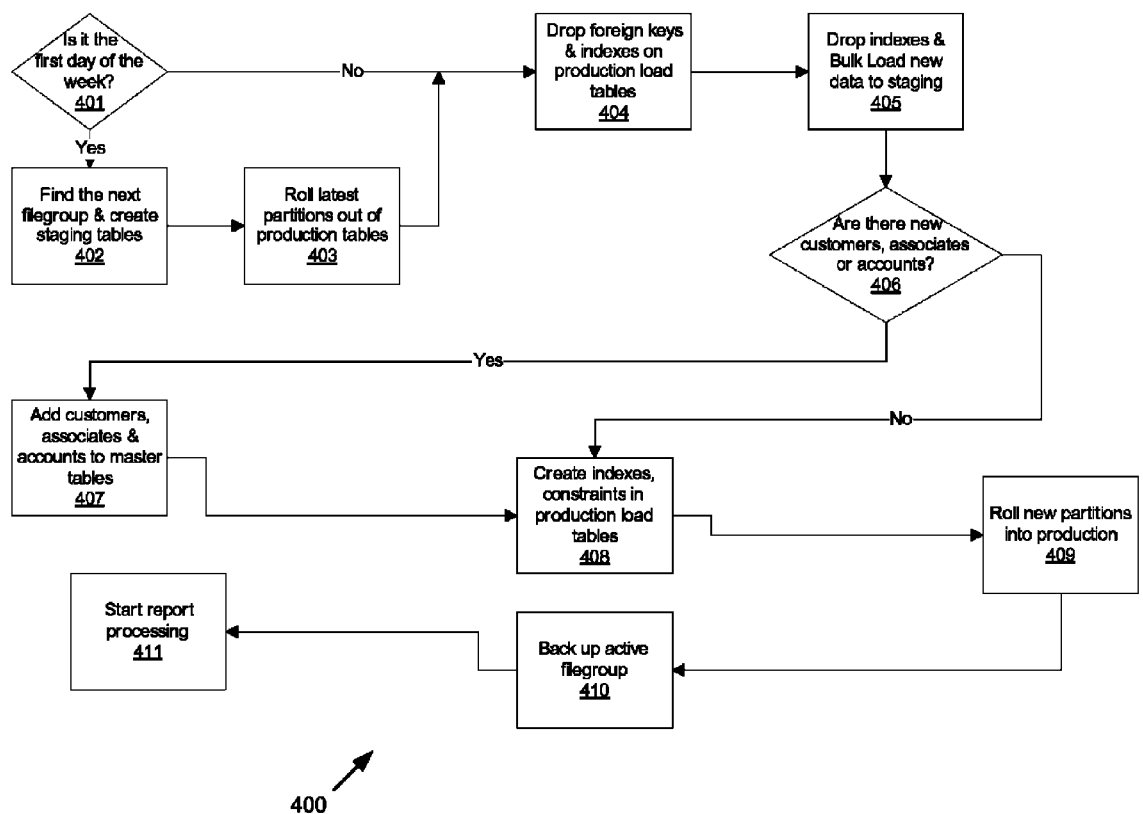
FIG. 4 is an illustrative flow diagram of a process for processing financial account transaction data.

As shown in FIG. 4, an illustrative staging/load process 400 checks if the present day is the first day of the week or other period (step 401). If so, then the next file group is found and a set of load tables for production database 206 are created for that week (step 402). Next, the latest partitions are rolled out of the tables of production database 206 in order to separate the current week's data from the previous week's data (step 403). If the present day is not the first day of the week in step 401, then step 402 is skipped. Next, existing foreign Structured Query Language (SQL) database keys and associated SQL database indexes are deleted from the tables of production database 206 so that they may be later regenerated to account for the newly-loaded data (step 404). Next, indexes are also deleted, and the new data is bulk loaded to load tables in production database 206 (step 405).

Next, the routine determines whether there any new customers, associates, and/or accounts (step 406). If so, then the new customers, associates, and/or accounts are added to the tables (step 407). This may involve, for instance, generating identifiers for the new customers, associated, and/or accounts to ensure that these new entities are uniquely identified within the system (in the event, for example, that two different accounts from two different conglomerated financial institutions have the same account number).

If the outcome is negative in step 406, then step 407 is skipped. Next, new indexes and constraints are created (step 408). These constraints may include foreign keys and any other limitations desired such as date ranges. Step 408 thus acts to regenerate the previously deleted indexes and foreign keys based on updates provided by the new data. Next, the load tables are merged into the existing production tables (step 409) as a new partition, and the active file groups are backed up for data security purposes (step 410).

Then, report processing may begin (step 411). Report processing 411 may search for predetermined features in the completed tables that may indicate a suspicious transaction or set of transactions. For example, report processing 411 may scan for transactions made at an odd time of day (e.g., the middle of the night), transactions that look up famous customers (e.g., movie stars), and transactions by one associate involving an account of another employee, such as the supervisor of the associate.

Database Administration

Figure 6:
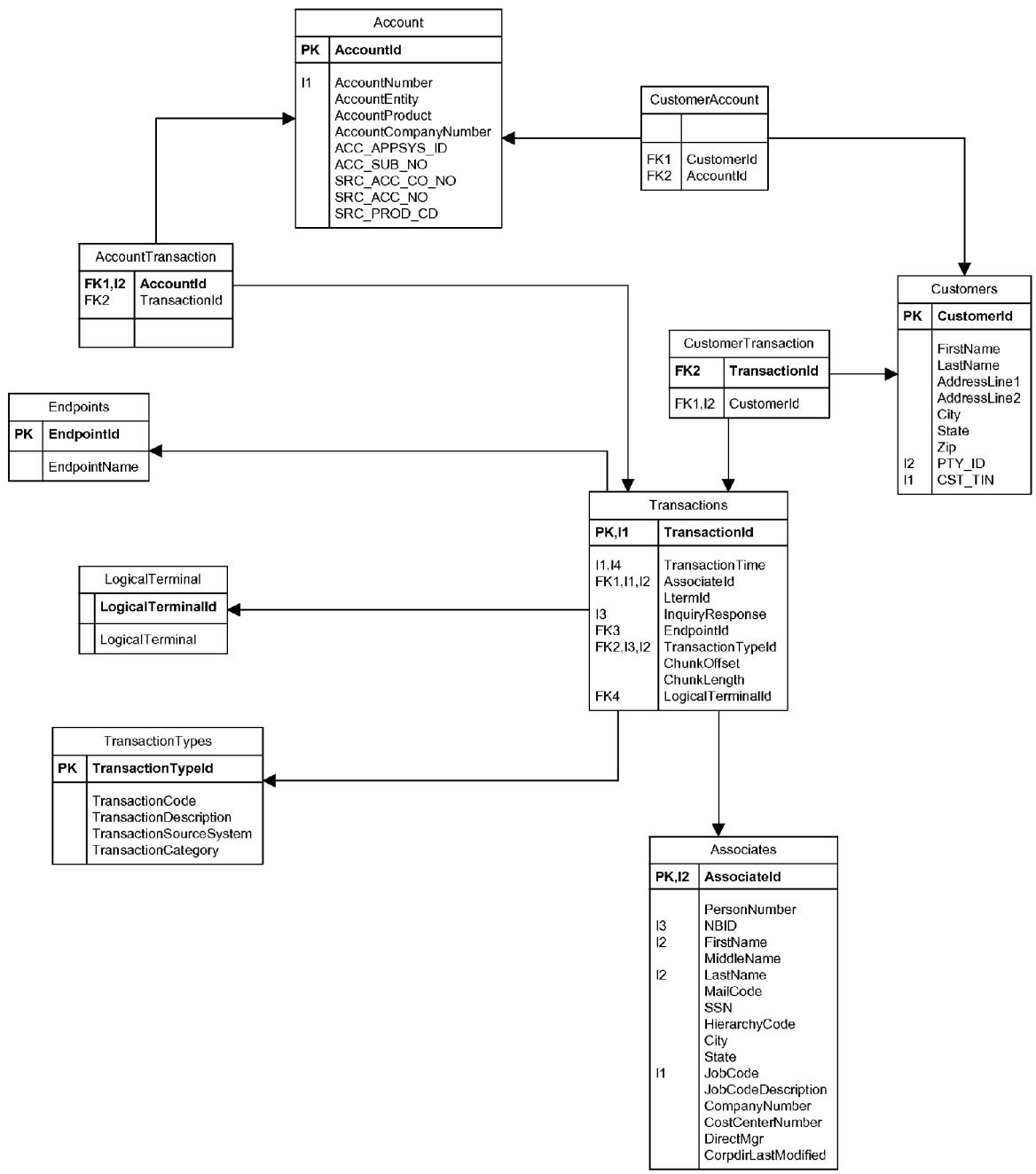
FIG. 6 is an illustrative database diagram of a production database.

Production database 206 and/or staging database 205 may define a plurality of tables, along with their indexes and foreign keys (i.e., relationships to other tables). For example, referring to FIG. 6, an illustrative database diagram of production database 206 and/or staging database 205 is shown. In this example, the tables are an Account table, an Account Transaction table, a Customer Account table, an Endpoints table, a Customer Transaction table, a Logical Terminal table, a Transactions table, a Customers table, a Transaction Types table, and an Associates table, each related to each other as shown. In FIG. 6, PK refers to a primary key, FK refers to a foreign key, and I refers to an index.

In FIG. 6, ACC_APPSYS_ID refers to account application system identification; ACC_SUB_NO refers to account sub number; SRC_ACC_CO_NO refers to source account company number; SRC_ACC_NO refers to source account number; SRC_PROD_CD refers to source product code; PTY_ID refers to party identification (e.g., the customer identifier); CST_TIN refers to the customer SSN or tax identification number (TIN); and CorpdirLastModified refers to the date that a record was last modified on the source system, which may be used to determine if an update is needed.

All of the fields under the Account table in this example may be used to uniquely identify an account among a conglomerate of smaller financial institutions. Of course, this is merely an example and fewer fields, additional fields, and/or other fields may be used to uniquely identify an account within the system.

User Interfaces

Figure 8:
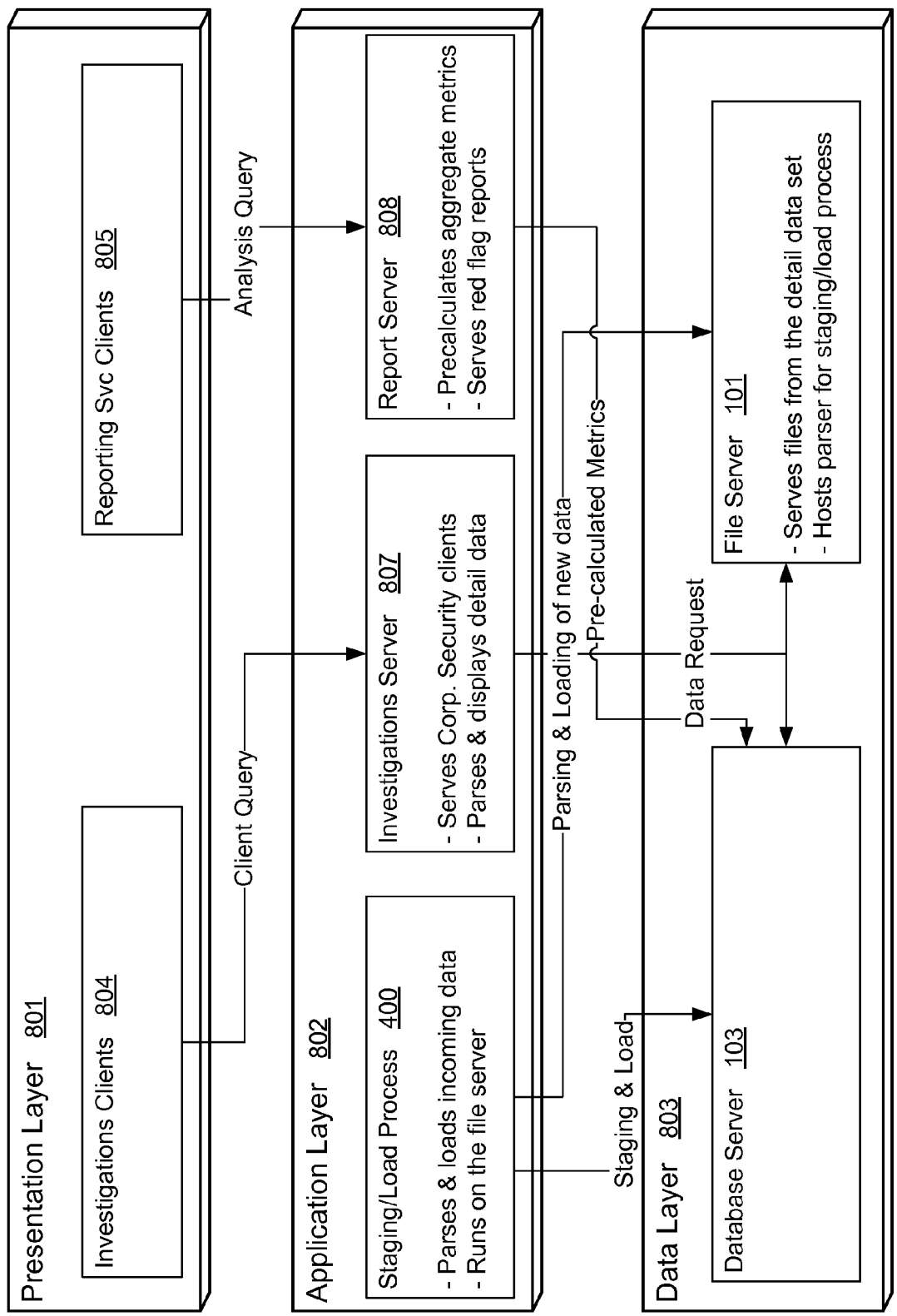
FIG. 8 shows an illustrative set of software layers, from the point of view of a system user.

One or more computer-implemented user interfaces may be provided. Referring to FIG. 8, an illustrative software layer diagram of the system from a user's point of view is shown. Any of these layers may be implemented in any one or more of servers 101, 102, 103, 104. The system software may be considered divided into a presentation layer 801, which sits upon an application layer 802, which in turn sits upon a data layer 803. Presentation layer 801 may include an investigations clients handler 804 and a reporting service clients handler 805. Application layer 802 may include staging/load process 400, an investigations server 807 (which may be implemented on file server 101, for example), and a report server 808 (which may also be implemented on file server 101, for example). Data layer 803 may include database server 103 and the portion of file server 101 that serves files from the detailed data set and hosts parser 204.

On type of user interface provided by the system may include an investigations interface, provided through investigations clients handler 804. Referring to FIG. 5, an illustrative screen shot of a displayed computer-implemented investigations user interface 501 is shown. Investigations user interface 501 may be provided, for example, via the Internet or other network, and/or via a terminal directly coupled to the system. Using investigations user interface 501, a user may perform searches of account transactional data maintained by the previously-described system, which may assist the user, for example, in performing investigations of improper account transaction patterns. As shown in this example, investigations interface 501 includes one or more fields for accepting user input (e.g., typewritten input from a keyboard), including a date range 502 having a beginning date and an and date, a plurality of fields 503 for entering one or more associate IDs, transaction codes, account numbers, and customer numbers (e.g., TINs) or SSNs. A check box is associated with each of fields 503 for activating/deactivating that associated field 503. A clear fields button 506 allows the user to clear fields 502 and 503. A submit button 507 allows the user to submit a search based on the user input entered into fields 502 and/or 503. Also included is a saved searches portion 504 that allows the user to expand, view, and select previous searches. Also included is a search results portion 505 that allows the user to view and select search results resulting from the search conducted on the user input provided in fields 502 and 503.

Figure 7:
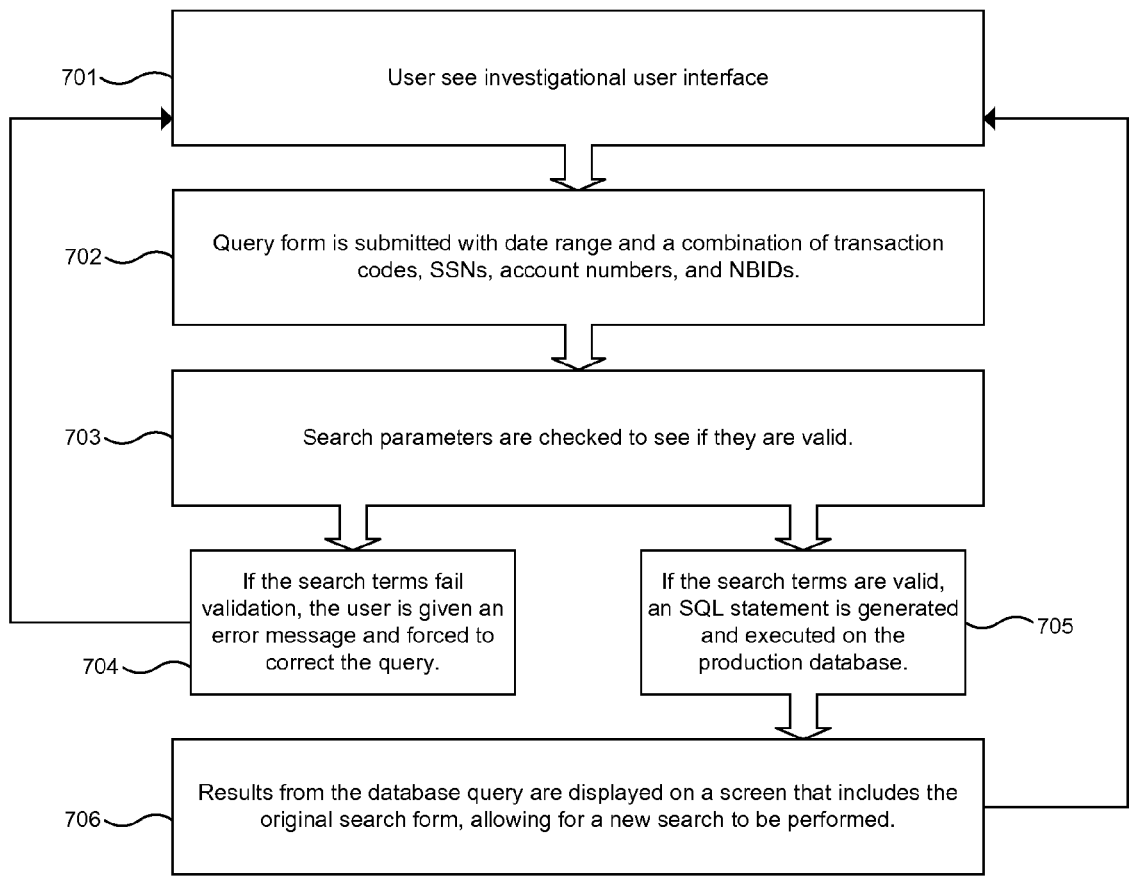
FIG. 7 is an illustrative flow diagram of a process for searching financial account transaction data.

The search may be a Boolean combination of the user input in fields 502 and 503. For example, the user may have entered user input as shown in FIG. 5, where the search date range 502 is 1/5/2007 to 2/8/2007, and the associate IDs field is selected and includes various associate IDs, and also the account numbers field is selected and includes various account numbers. In operation, the user interface is displayed to the user (step 701 of FIG. 7), and the user enters the search parameters into fields 502 and 503 and selects submit button 507 (step 702). In response, the search parameters are check for validity (step 703), and if they fail validation an error message is displayed to the user (step 704). If the search terms are valid, a SQL statement is generated and executed on production database 206 (step 705). In the present example, the search may Boolean OR each entry within a given field (e.g., the associate IDs may be ORed with each other and the account numbers may be ORed with each other), and each field may be Boolean ANDed with each other (e.g., the associate IDs field as a whole may be ANDed with the account numbers field as a whole). Thus, for instance, the search may perform the following search: (Date Range=1/5/2007-2/8/2007) AND (associate ID=XXXXXX OR XXXXXX) AND (account number=X-XXXXXXXXX OR X-XXXXXXXXX OR X-XX-XXX-XXX), where each "X" represents and alphanumeric character.

The results of this search may be displayed in search results portion 505 (step 706), as illustratively shown in FIG. 10. The search results may show each transaction meeting the search criteria. The user may select any individual transaction in the search results, and in response the user interface may provide additional details of that transaction. Although particular fields are shown in the illustrative search results, other fields may be used alternatively or in addition to those fields shown. For instance, the search results may include any fields contained in production database 206, such as associate ID, transaction code, account number, customer number and/or SSN, party ID, customer information such as name and address, and/or other account information.

Where only certain details of a transaction search result are desired, these further details may be obtained directly from production database 206. However, additional details mat not be stored in production database 206 but may be desired by the user. For example, the user may want to see the full name and/or address of the account holder, the amount involved in the transaction, the payee name, the identity of the joint account holder, the account balance, the account holder's date of birth, and/or the check number for the transaction, etc. In this case, the user may "drill down" by requesting the system to obtain and decompress any additional information about the transaction from long-term raw storage 207. To find the transaction information in long-term raw storage 207, the Transactions table (FIG. 6) may be consulted to determine the chunk offset and/or chunk length of the transaction. These values refer to the chunk offset and chunk length of the full transaction data as stored in long-term raw storage 207. Once the transaction is pulled from long-term raw storage 207, the transaction data may be decompressed, parsed on the fly by parser 204, and displayed to the user by investigations clients handler 804.

As an example, consider a transaction #12345, wherein the ChunkOffset is 2041 and the ChunkLength is 108. Therefore, in order to read the original data, the appropriate file in the long-term raw storage 207 would be opened, and data starting at 2041 bytes would be read from the beginning of the file, which is the beginning of transaction #12345. Reading would continue until 108 bytes had been read, and so reading would end at byte 2149.

Figure 9:
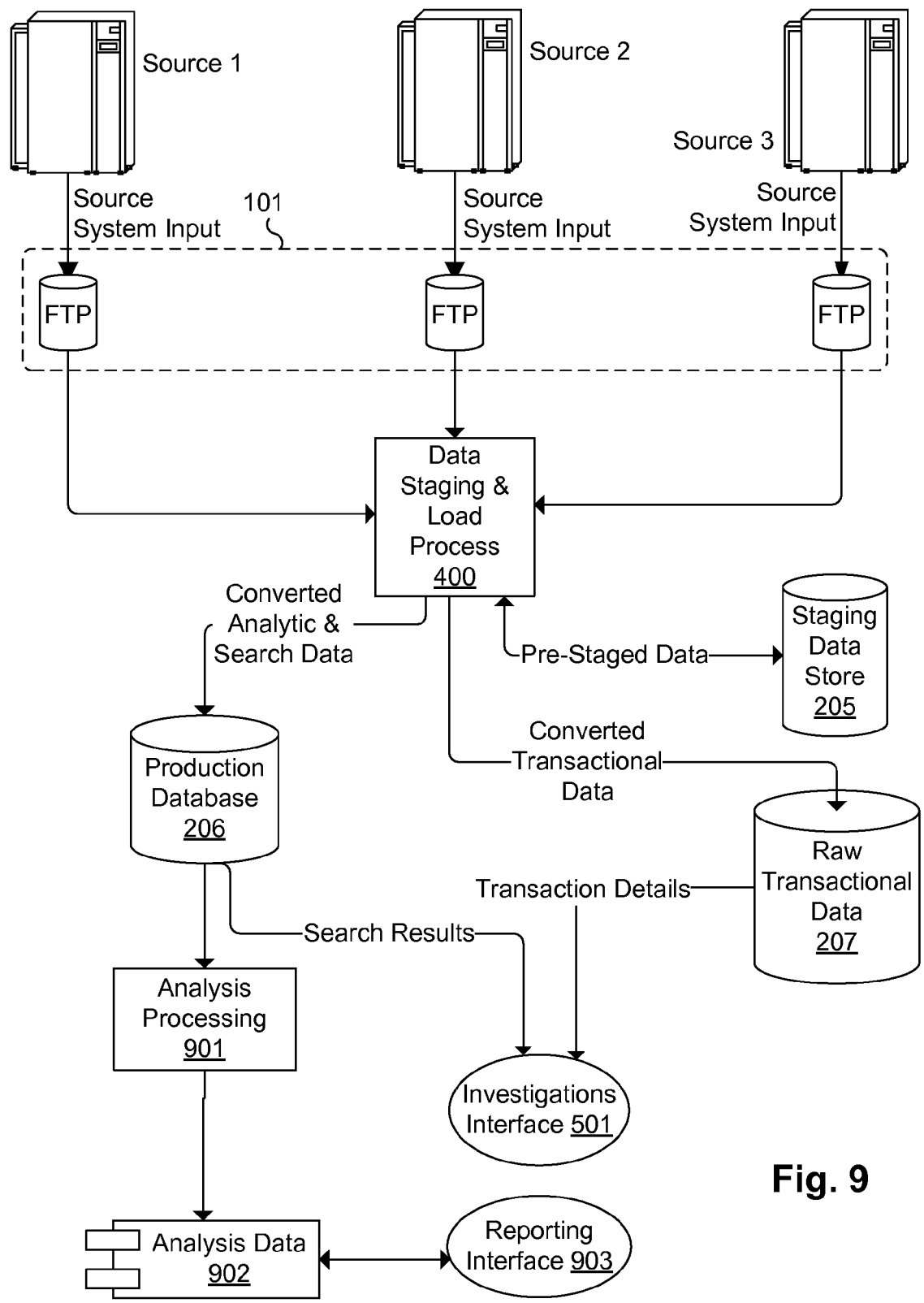
FIG. 9 is another illustrative functional block diagram of the system of FIG. 1.

Another type of computer-implemented user interface that may be displayed to the user is a reporting user interface 903 (FIG. 9), which may be provided through reporting service clients handler 805. This user interface may allow the user to view automatically generated reports based on pre-defined criteria, where the search results using the pre-defined criteria provide analysis data 902 for the reports, generated by an analysis processing unit 901, such as a computer or other processor. In general, it may be expected that such a user interface 903 may be used for red-flag reporting of suspicious transactions, such as those involving transactions made at an odd time of day (e.g., the middle of the night), transactions that look up famous customers (e.g., movie stars), and transactions by one associate involving an account of another employee, such as the supervisor of the associate. Other criteria used for searching to provide the automated reports may include, for instance, factors relevant to intrusion detection techniques, such as associate profiles, which may be adjusted based on transactions in which the associate is involved. The system may thus recognize signatures of potentially bad activity and provide reports of transactions that are part of the potentially bad activity.

The invention claimed is:

1. In a financial transaction management system, a method comprising:
    storing in a first database first data representing a plurality of financial transactions;
    storing in a second database second data referencing each of the financial transactions, including, for each of the financial transactions, an offset of the financial transaction within the first data;
    compressing the first data to generate third data comprising a plurality of compressed data blocks each having a different offset of the respective data block within the third data;
    for each of the financial transactions, associating the offset of the financial transaction in the first data with the offset of one of the compressed data blocks;
    determining one of the financial transactions;
    determining, by a computer, from the second data the offset of the identified financial transaction in the first data;
    determining, by the computer, which of the compressed data blocks has an offset corresponding to the offset of the identified financial transaction;
    retrieving, by the computer, data from the determined one of the compressed data blocks; and
    decompressing, by the computer, the determined one of the compressed data blocks.

2. The method of claim 1, further comprising causing, by the computer, data from the decompressed data block to be displayed on a display device.

3. The method of claim 1, further comprising parsing the first data to identify each of the financial transactions and to identify characteristics of each of the transactions, wherein the second data comprises the characteristics, and wherein determining the financial transaction comprises:
    receiving a query identifying a criterion;
    comparing the criterion to the characteristics in the second data to determine the financial transaction based on the comparison.

4. The method of claim 3, wherein the criterion comprises a financial account number.

5. A non-transitory computer-readable medium storing computer-executable instructions, such that when the computer-executable instructions are performed by a computer, the computer performs steps comprising:
    storing in a first database first data representing a plurality of financial transactions;
    storing in a second database second data referencing each of the financial transactions, including, for each of the financial transactions, an offset of the financial transaction within the first data;
    compressing the first data to generate third data comprising a plurality of compressed data blocks each having a different offset of the respective data block within the third data;
    for each of the financial transactions, associating the offset of the financial transaction in the first data with the offset of one of the compressed data blocks;
    determining one of the financial transactions;
    determining, from the second data, the offset of the identified financial transaction in the first data;

determining which of the compressed data blocks has an offset corresponding to the offset of the identified financial transaction;
retrieving data from the determined one of the compressed data blocks; and
decompressing the determined one of the compressed data blocks.

6. The non-transitory computer-readable medium of claim 5, wherein the steps further comprise causing data from the decompressed data block to be displayed on a display device.

7. The non-transitory computer-readable medium of claim 5, wherein the steps further comprise parsing the first data to identify each of the financial transactions and to identify characteristics of each of the transactions, wherein the second data comprises the characteristics, and wherein determining the financial transaction comprises:
receiving a query identifying a criterion;
comparing the criterion to the characteristics in the second data to determine the financial transaction based on the comparison.

8. The non-transitory computer-readable medium of claim 7, wherein the criterion comprises a financial account number.

* * * * *